(12) United States Patent
Koh

(10) Patent No.: US 12,507,886 B2
(45) Date of Patent: Dec. 30, 2025

(54) APPARATUS FOR MEASURING EYELID TENSION, SYSTEM FOR PROCESSING DATA OF EYELID TENSION, AND METHOD FOR PROCESSING DATA OF EYELID TENSION

(71) Applicant: Il Hwan Koh, Seongnam-si (KR)

(72) Inventor: Il Hwan Koh, Seongnam-si (KR)

( * ) Notice: Subject to any disclaimer, the term of this patent is extended or adjusted under 35 U.S.C. 154(b) by 761 days.

(21) Appl. No.: 17/640,290

(22) PCT Filed: Sep. 3, 2020

(86) PCT No.: PCT/KR2020/011833
§ 371 (c)(1),
(2) Date: Mar. 3, 2022

(87) PCT Pub. No.: WO2021/049815
PCT Pub. Date: Mar. 18, 2021

(65) Prior Publication Data
US 2022/0322931 A1 Oct. 13, 2022

(30) Foreign Application Priority Data
Sep. 9, 2019 (KR) .................. 10-2019-0111680

(51) Int. Cl.
*A61B 3/10* (2006.01)
*A61B 5/00* (2006.01)
(Continued)

(52) U.S. Cl.
CPC .................. *A61B 3/10* (2013.01); *A61B 5/22* (2013.01); *A61B 5/7275* (2013.01); *A61B 5/742* (2013.01);
(Continued)

(58) Field of Classification Search
CPC .......... A61B 3/10; A61B 5/22; A61B 5/7275; A61B 5/742; A61B 5/6821;
(Continued)

(56) References Cited

U.S. PATENT DOCUMENTS 5,441,040 A * 8/1995 Williams, Jr. ...... A61B 17/0231
600/32
2009/0182203 A1 * 7/2009 Hartnick ............ A61B 17/0206
600/219
(Continued)

FOREIGN PATENT DOCUMENTS

CN 107997794 A 5/2018
JP 2008-307275 A 12/2008
(Continued)

OTHER PUBLICATIONS

International Search Report and Written Opinion mailed Dec. 7, 2020 in International Application No. PCT/KR2020/011833. (English translation of ISR.).
(Continued)

*Primary Examiner* — Abid A Mustansir
(74) *Attorney, Agent, or Firm* — Knobbe, Martens, Olson, & Bear, LLP

(57) ABSTRACT

An apparatus for measuring an eyelid tension according to an embodiment of the present disclosure includes: an eyelid speculum configured to widen an interval between an upper eyelid and an lower eyelid; an eyelid tension measuring sensor attached to one side of the eyelid speculum and configured to measure the eyelid tension of a person to be measured and output eyelid tension data; a position sensor configured to measure the interval between the upper eyelid and the lower eyelid; and a communication module configured to transmit the eyelid tension data to an analysis device.

10 Claims, 11 Drawing Sheets

(51) Int. Cl.
  *A61B 5/22*     (2006.01)
  *A61B 90/00*    (2016.01)
(52) U.S. Cl.
  CPC ....... *A61B 5/6821* (2013.01); *A61B 2090/065* (2016.02); *A61B 2090/066* (2016.02)
(58) Field of Classification Search
  CPC ........ A61B 2090/065; A61B 2090/066; A61B 3/107; A61B 3/16; A61B 5/0002; A61B 2090/064; A61B 90/06; A61B 3/0083
  See application file for complete search history.

(56) References Cited

U.S. PATENT DOCUMENTS

| | | | |
|---|---|---|---|
| 2015/0305732 A1* | 10/2015 | Dahl | A61B 17/02 600/219 |
| 2017/0119311 A1* | 5/2017 | Iwasaki | G02C 7/083 |
| 2017/0354326 A1 | 12/2017 | Pugh et al. | |

FOREIGN PATENT DOCUMENTS

| | | | |
|---|---|---|---|
| JP | 5276283 B2 * | 8/2013 | |
| JP | 2014-033906 A | 2/2014 | |
| KR | 10-2015-0055905 A | 5/2015 | |
| KR | 101538678 B1 * | 7/2015 | |
| KR | 10-1568104 B1 | 11/2015 | |
| KR | 10-2017-0140090 A | 12/2017 | |
| KR | 10-2019-0074637 A | 6/2019 | |

OTHER PUBLICATIONS

Office Action dated Jul. 15, 2021 in Korean Application No. 10-2019-0111680.

Extended European Search Report dated Jul. 6, 2023 in corresponding European Application No. 20862077.3.

* cited by examiner

FIG. 9

| Interval (mm) | Reference output voltage (V) | Reference eyelid tension (N) | Measured output voltage (V) | Measured eyelid tension (N) | Eyelid state |
|---|---|---|---|---|---|
| 3 | $V_{R1}$ | $T_{R1}$ | $V_{M1}$ | $T_{M1}$ | Strong grade |
| 6 | $V_{R2}$ | $T_{R2}$ | $V_{M2}$ | $T_{M2}$ | Strong grade |
| 9 | $V_{R3}$ | $T_{R3}$ | $V_{M3}$ | $T_{M3}$ | Strong grade |
| 12 | $V_{R4}$ | $T_{R4}$ | $V_{M4}$ | $T_{M4}$ | Strong grade |
| 15 | $V_{R5}$ | $T_{R5}$ | $V_{M5}$ | $T_{M5}$ | Strong grade |
| ⋮ | ⋮ | ⋮ | ⋮ | ⋮ | ⋮ |

APPARATUS FOR MEASURING EYELID TENSION, SYSTEM FOR PROCESSING DATA OF EYELID TENSION, AND METHOD FOR PROCESSING DATA OF EYELID TENSION

The present application is a U.S. national phase application under 35 U.S.C. § 371 of International Application No. PCT/KR2020/011833, filed on Sep. 3, 2020, which claims the benefit of Korean Patent Application No. 10-2019-0111680 filed on Sep. 9, 2019 in the Korean Intellectual Property Office, the entire disclosure of each of which is incorporated herein by reference.

TECHNICAL FIELD

The present disclosure relates to an apparatus for measuring an eyelid tension, a system for processing eyelid tension data, and a method of processing the eyelid tension data.

BACKGROUND

An eyeball has internal pressure that resists an external atmosphere. This internal pressure is called intraocular pressure. A shape of the eyeball may be maintained by the intraocular pressure. For example, the eyeball may have a spherical shape. A cornea surrounds a front of the eyeball. When the cornea has a uniform thickness, there is no problem in maintaining the shape of the cornea. In addition, even though the thickness of the cornea is slightly changed due to a vision correction surgery, when the cornea can sufficiently resist the intraocular pressure, there is no problem in maintaining the shape of the cornea. However, when the intraocular pressure is excessively increased or the resistance of the eyeball (especially, the cornea) is weakened due to various factors, the eyeball may be deformed. For example, keratoconus is a symptom in which a part of the cornea protrudes in a cone shape and is accompanied by various inconveniences such as decreased vision and eye pain.

Practically, a force applied to an eyeball by an upper eyelid rather than a lower eyelid may be considered as a more important factor. However, a degree of influence may vary according to characteristics of an individual eyelid. As such, since an eyelid tension has a direct effect on the eyeball, the eyelid tension may be considered as an important factor in cornea-related vision correction surgery or treatment of corneal-related diseases. The eyelid tension also may increase pressure applied to the eyeball to thereby cause an increase in the intraocular pressure. However, an apparatus capable of objectively measuring the eyelid tension has not been adequately developed. There is a need for research on how to use a measured value of the eyelid tension.

SUMMARY

Keratectasia is the most serious complication that occurs during LASIK/LASEK surgery. In order to prevent keratectasia, the thickness of the cornea should be thickly secured during surgery. In addition, when the cornea is ablated less, this is also to lower the risk of keratectasia. Therefore, in order to predict the possibility of postoperative keratectasia in advance, it is necessary to measure the eyelid tension of all patients considering LASIK/LASEK surgery.

The apparatuses for measuring the eyelid tension that have already been developed are quite large and complex. When an initial setting is slightly wrong, there is a great possibility of an error in a measured value, and it takes a lot of time and effort for a doctor to measure the eyelid tension during treatment.

Various embodiments of the present disclosure provide an apparatus for measuring eyelid tension, which is capable of measuring the eyelid tension of a user by installing a sensor in an eyelid speculum. Various embodiments of the present disclosure provide a system for processing eyelid tension data, which includes the apparatus for measuring the eyelid tension. Various embodiments of the present disclosure provide a method of processing eyelid tension data measured through the apparatus for measuring the eyelid tension.

An apparatus for measuring an eyelid tension according to one embodiment of the present disclosure includes: an eyelid speculum configured to widen an interval between an upper eyelid and a lower eyelid; an eyelid tension measuring sensor attached to one side of the eyelid speculum and configured to measure the eyelid tension of a person to be measured and output eyelid tension data; a position sensor configured to measure the interval between the upper eyelid and the lower eyelid; and a communication module configured to transmit the eyelid tension data to an analysis apparatus.

In one embodiment, the eyelid speculum may include: two arms having shapes symmetrical to each other with respect to a central axis; two links rotatably connected to the two arms, respectively, and disposed symmetrically with respect to the central axis; a connection member configured to rotatably connect the two links to each other; a frame rotatably connected to one end portion of each of the two arms; a screw screw-coupled to the frame, one end portion of the screw being coupled to the connection member; and a first pedestal and a second pedestal coupled to the other end portions of the two arms, respectively, and configured to support the upper eyelid and the lower eyelid, respectively.

In one embodiment, the eyelid tension measuring sensor may be installed in at least one of the first pedestal and the second pedestal and may be configured to measure a pressure applied to the first pedestal and the second pedestal.

In one embodiment, the eyelid tension measuring sensor may be installed on at least one of the two arms and may be configured to measure an elastic strain of the arms.

In one embodiment, the eyelid tension measuring sensor may be installed at the screw and may be configured to measure a torque applied to the screw.

In one embodiment, the position sensor may be installed on at least one of the first pedestal and the second pedestal and may measure an interval between the first pedestal and the second pedestal.

In one embodiment, the eyelid speculum may include: a first arm connected to a first pedestal; a second arm connected to a second pedestal; and a joint configured to connect the first arm and the second arm to each other.

In one embodiment, the eyelid tension measuring sensor may be installed on at least one of the first arm and the second arm and may be configured to measure a displacement of the first arm or the second arm.

In one embodiment, the eyelid speculum may include: a main body; a first arm and a second arm movably coupled to the main body with a predetermined interval between the first arm and the second arm; a first leg and a second leg coupled to the first arm and the second arm, respectively;

and a first pedestal and a second pedestal coupled to the first leg and the second leg, respectively.

In one embodiment, the eyelid tension measuring sensor may be installed in each of the first pedestal and the second pedestal and may be configured to measure the pressure applied to the first pedestal and the second pedestal.

In one embodiment, the eyelid speculum may further include a distance indicator configured to indicate a distance between the first arm and the second arm.

In one embodiment, the main body may include a display configured to display the eyelid tension data.

In one embodiment, the apparatus may further include a mounting part on which the eyelid speculum is installed to be moved vertically or laterally.

A system for processing eyelid tension data according to one embodiment of the present disclosure includes: the apparatus for measuring eyelid tension which is configured to measure the eyelid tension of a person to be measured and output measurement data; and an analysis apparatus configured to compare the measurement data with pre-stored reference data to determine an eye state of the person to be measured.

A method of processing eyelid tension data according to one embodiment of the present disclosure includes: inputting preset reference data to an analysis apparatus; measuring an eyelid tension of a person to be measured using an apparatus for measuring eyelid tension and outputting the measured eyelid tension as measurement data; comparing the measurement data with the reference data by the analysis apparatus; and determining an eyelid state of the person to be measured based on a difference value between the measurement data and the reference data.

In one embodiment, the reference data may be calculated based on the measurement data of a plurality of persons to be measured which are measured according to a preset interval.

According to embodiments of the present disclosure, in order to overcome the problems of the above-described conventional method, the eyelid tension, which includes a blinking force and a muscle tone in a basic static state of an orbicularis oculi muscle constituting the eyelids, can be evaluated by measuring an amount of force required in a process of opening the eyelids.

According to embodiments of the present disclosure, a process of mounting the apparatus of measuring eyelid tension on the eye is very simple. Regardless of a movement of a patient's head or body, it is possible to solve the problem that the eyelid tension measured according to the conventional method reflects only a part of the eyelid. It is possible to considerably improve reproducibility or reliability of a measured value of the eyelid tension.

According to embodiments of the present disclosure, since it is possible to objectively evaluate the eyelid tension, it is possible to improve effectiveness of diagnosis and treatment of keratoconus, keratectasia, and regular and irregular astigmatism which are greatly affected by the eyelid tension.

BRIEF DESCRIPTION OF THE DRAWINGS

FIG. 9 is a table for describing the method of processing eyelid tension data according to one embodiment of the present disclosure.

DETAILED DESCRIPTION

Figure 1:
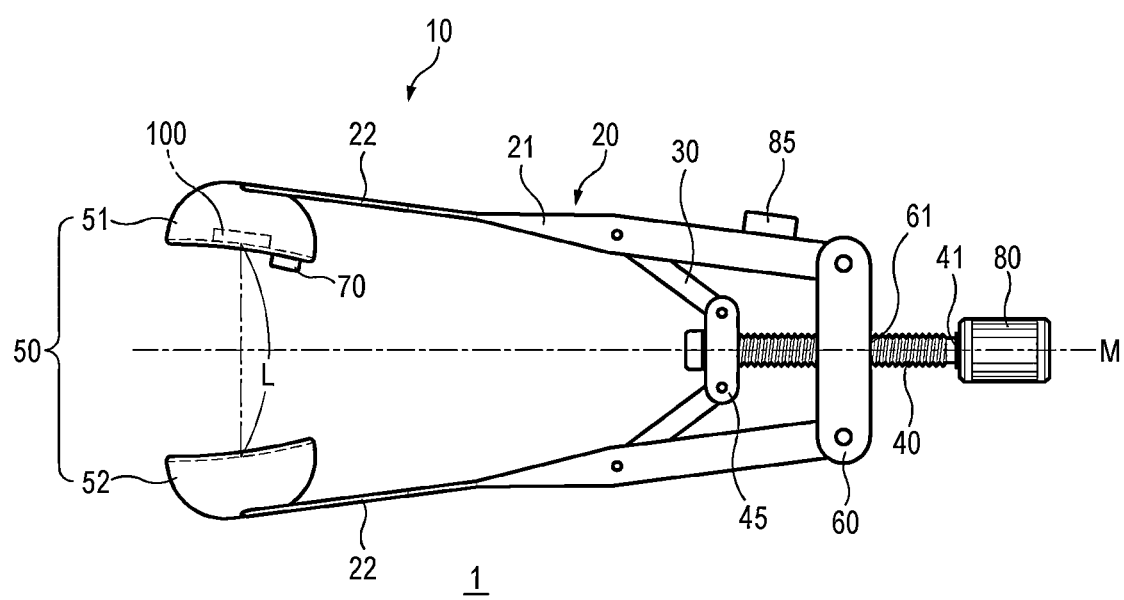
FIG. 1 is a perspective view illustrating an apparatus for measuring eyelid tension according to one embodiment of the present disclosure.

Embodiments of the present disclosure are shown for the purpose of explaining the technical idea of the present disclosure. The scope of rights according to the present disclosure is not limited to the embodiments presented below or the detailed descriptions of such embodiments.

All technical terms and scientific terms used in the present disclosure have the meaning generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising," "including," "having," and the like are to be understood as open-ended terms having the possibility of encompassing other embodiments, unless mentioned otherwise with respect to the phrase or sentence containing such expressions.

The singular expressions that are described in the present disclosure may encompass plural expressions unless otherwise stated, which will be also applied to the singular expressions in the claims.

The expressions such as "first," "second," etc., which are shown in the present disclosure, are used to distinguish a plurality of elements from one another, and are not intended to limit the order or importance of the corresponding elements.

The expression "based on" used herein is used to describe one or more factors that influence actions of a decision, a determination, or an operation described in a phrase or sentence including the relevant expression, and this expression does not exclude an additional factor influencing the decision, the action of determination, or the operation.

When a certain component is described herein as "coupled to" or "connected to" another component, this should be understood as meaning that the certain component may be directly coupled or connected to another component or that the certain component may be coupled or connected to the other component via a new intervening component.

Hereinafter, embodiments of the present disclosure will be described with reference to the accompanying drawings. In the accompanying drawings, the like or relevant components are indicated by like reference numerals. In the following description of embodiments, repeated descriptions of the identical or relevant components will be omitted. However, even if the descriptions of components are omitted, such a component is not intended to be excluded in an embodiment.

FIG. 1 is a perspective view illustrating an apparatus 1 for measuring eyelid tension according to one embodiment of the present disclosure.

The apparatus 1 for measuring eyelid tension may include an eyelid speculum 10 and a pressure sensor 100 attached to the eyelid speculum 10. The pressure sensor 100 may have a pad-like shape. The pressure sensor 100 may be in direct contact with a lower end portion of an upper eyelid to measure the eyelid tension applied to the eyelid speculum 10 by the upper eyelid. The eyelid speculum 10 may include an arm 20, a link 30, a connection member 45, a frame 60, and a screw 40.

Two arms 20 may be provided to have shapes symmetrical to each other with respect to a central axis M. One end portion of the arm 20 may be rotatably connected to an end portion of the frame 60. A pedestal 50 for supporting an eyelid may be fixed to the other end portion of the arm 20. The arm 20 may include a connection arm 21 connected to the link 30 and a load arm 22 which has less strength than the connection arm 21 and to which the pedestal 50 is fixed.

One end portion of the link 30 is rotatably connected to the connection arm 21, and the other end portion of the link 30 is rotatably connected to the connection member 45. The connection member 45 may be connected to the screw 40 such that a leading end of the screw 40 is fixed. Accordingly, the two arms 20 may be connected to the connection member 45 through the two links 30 to form a linkage structure.

A male screw of the screw 40 may be engaged with a female screw formed in an opening 61 of the frame 60. When a user rotates a head 41 of the screw 40, the screw 40 may be moved relative to the frame 60. In addition, when the screw 40 is moved, the connection member 45 may be moved, and the connection member 45 may move the link 30 by the movement of the screw 40. As a result, the arm 20 may be moved. That is, an interval between the two arms 20 may be adjusted by the screw 40.

The pedestal 50 may include a first pedestal 51 and a second pedestal 52. The pressure sensor 100 may be disposed in the first pedestal 51. An interval L between the first pedestal 51 and the second pedestal 52 may be adjusted by the screw 40. The pressure sensor 100 may be in contact with a lower end portion of an upper eyelid of a person to be measured. The pressure sensor 100 may include, for example, a piezoelectric element.

A wireless communication module 85 may be attached to the arm 20 to transmit a measured value measured by the pressure sensor 100 to a diagnostic apparatus (not shown). The wireless communication module 85 may be connected to the pressure sensor 100 to transmit an output value measured by the pressure sensor 100 to an external analysis apparatus (not shown). Accordingly, the eyelid tension can be measured even when the pressure sensor 100 and the analysis apparatus (not shown) are not directly connected using a wire.

When the pressure sensor 100 is strongly pressed by the upper eyelid, a high output value (for example, a voltage) may be output. On the other hand, when the pressure sensor 100 is relatively weakly pressed by the upper eyelid, the pressure sensor 100 may output a low output value (for example, a voltage).

In one embodiment, the apparatus 1 for measuring eyelid tension may automatically measure the eyelid tension of the person to be measured. To this end, the apparatus 1 for measuring eyelid tension may include a position sensor 70 and an actuator 80. The position sensor 70 may be attached to a lower side of the first pedestal 51 to measure the interval L between the first pedestal 51 and the second pedestal 52. In addition, the actuator 80 may rotate the screw 40. The actuator 80 may be provided as, for example, a motor.

In a state in which the person to be measured wears the apparatus 1 for measuring eyelid tension, the actuator 80 may rotate the screw 40 in a forward direction or a reverse direction. In such a process, the position sensor 70 measures the interval L, and the pressure sensor 100 outputs an output value corresponding to each interval L. For the accuracy of measurement, the actuator 80 may rotate the screw 40 several times in the forward direction or the reverse direction, and an output value according to each case may be calculated as an average value.

In one embodiment, the pressure sensor 100 may operate the actuator 80 to adjust the interval L to 3 mm, 6 mm, 9 mm, 12 mm, 15 mm, 18 mm, 21 mm, or the like and measure the eyelid tension as an output value corresponding to each interval L.

In one embodiment, the pressure sensor 100 may operate the actuator 80 to continuously adjust the interval L from 0 mm to 20 mm and measure the eyelid tension as an output value in the form of a curve corresponding to the interval L.

Figure 2:
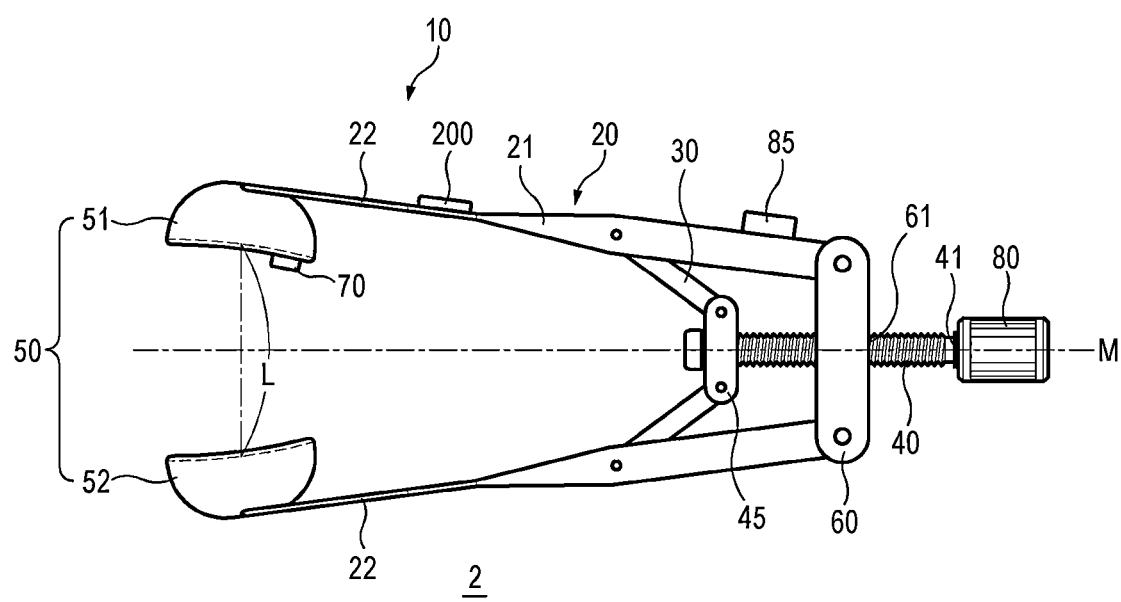
FIG. 2 is a perspective view illustrating an apparatus for measuring eyelid tension according to one embodiment of the present disclosure.

FIG. 2 is a perspective view illustrating an apparatus 2 for measuring eyelid tension according to one embodiment of the present disclosure. Descriptions of components overlapping those described in the above embodiment will be omitted.

The apparatus 2 for measuring eyelid tension may include the eyelid speculum 10 and a strain sensor 200. The strain sensor 200 may be provided as, for example, a strain gauge. The strain sensor 200 may be configured to measure an elastic strain of the load arm 22 connected to the first pedestal 51.

In two cases having the same interval L, when the eyelid tension of the person to be measured is large, the load arm 22 may be more deformed, and the strain sensor 200 may output a larger output value (for example, a voltage). Conversely, when the eyelid tension of the person to be measured is small, the load arm 22 may be less deformed, and the strain sensor 200 may output a smaller output value (for example, a voltage).

In one embodiment, the apparatus 2 for measuring eyelid tension may automatically measure the eyelid tension of the person to be measured. To this end, the apparatus 2 for measuring eyelid tension may include the position sensor 70 and the actuator 80. The position sensor 70 may be attached to a lower side of the first pedestal 51 to measure the interval L between the first pedestal 51 and the second pedestal 52.

In one embodiment, the strain sensor 200 may operate the actuator 80 to adjust the interval L to 3 mm, 6 mm, 9 mm, 12 mm, 15 mm, 18 mm, 21 mm, or the like and measure the eyelid tension as an output value corresponding to each interval L.

In one embodiment, the strain sensor 200 may operate the actuator 80 to continuously adjust the interval L from 0 mm to 20 mm and measure the eyelid tension as an output value in the form of a curve corresponding to the interval L.

Figure 3:
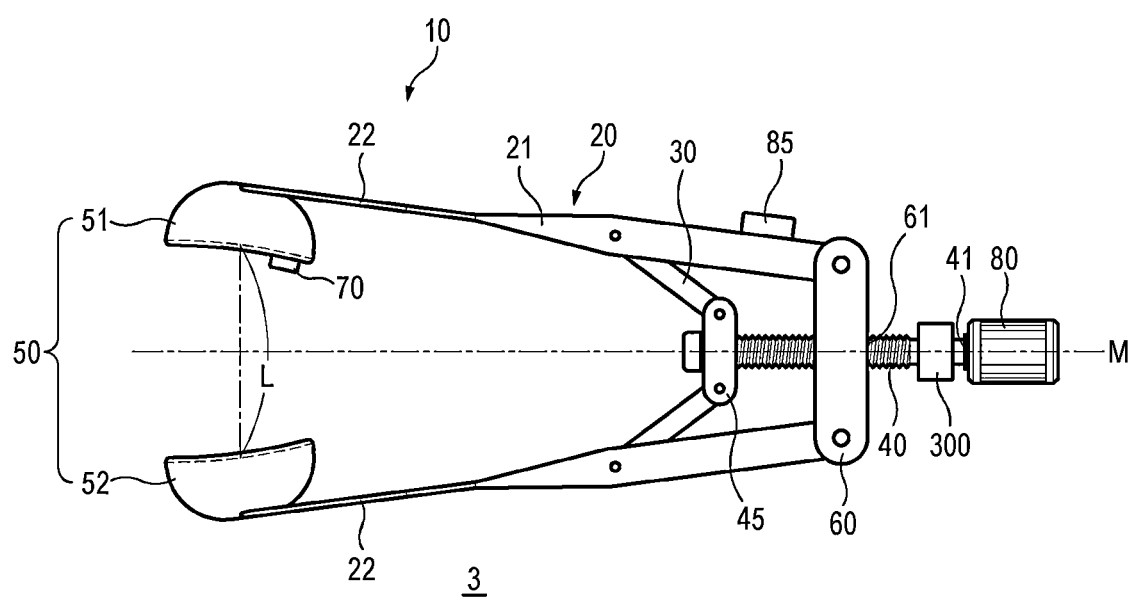
FIG. 3 is a perspective view illustrating an apparatus for measuring eyelid tension according to one embodiment of the present disclosure.

FIG. 3 is a perspective view illustrating an apparatus 3 for measuring eyelid tension according to one embodiment of the present disclosure. Descriptions of components overlapping those described in the above embodiment will be omitted.

The apparatus 3 for measuring eyelid tension may include the eyelid speculum 10 and a torque sensor 300. The torque sensor 300 may measure a torque transmitted when a rotating shaft actually moves. The torque sensor 300 may be, for example, a magnetostrictive torque sensor, a strain gauge type torque sensor, a phase difference detection type torque sensor, or the like. The torque sensor 300 may be configured to measure the torque applied to the screw 40 when the actuator 80 rotates the screw 40.

In two cases having the same interval L, when the eyelid tension of the person to be measured is large, the actuator 80 applies a larger torque to the screw 40, thereby rotating the screw 40. As a result, the torque sensor 300 may output a larger output value (for example, a voltage). Conversely, when the eyelid tension of the person to be measured is small, the actuator 80 applies a smaller torque to the screw 40, thereby rotating the screw 40. As a result, the torque sensor 300 may output a smaller output value (for example, a voltage).

In one embodiment, the apparatus 3 for measuring eyelid tension may automatically measure the eyelid tension of the person to be measured. To this end, the apparatus 3 for measuring eyelid tension may include the position sensor 70 and the actuator 80. The position sensor 70 may be attached to a lower side of the first pedestal 51 to measure the interval L between the first pedestal 51 and the second pedestal 52.

In one embodiment, the torque sensor 300 may operate the actuator 80 to adjust the interval L to 3 mm, 6 mm, 9 mm, 12 mm, 15 mm, 18 mm, 21 mm, or the like and measure the eyelid tension as an output value corresponding to each interval L.

In one embodiment, the torque sensor 300 may operate the actuator 80 to continuously adjust the interval L from 0 mm to 20 mm and measure the eyelid tension as an output value in the form of a curve corresponding to the interval L.

Figure 4:
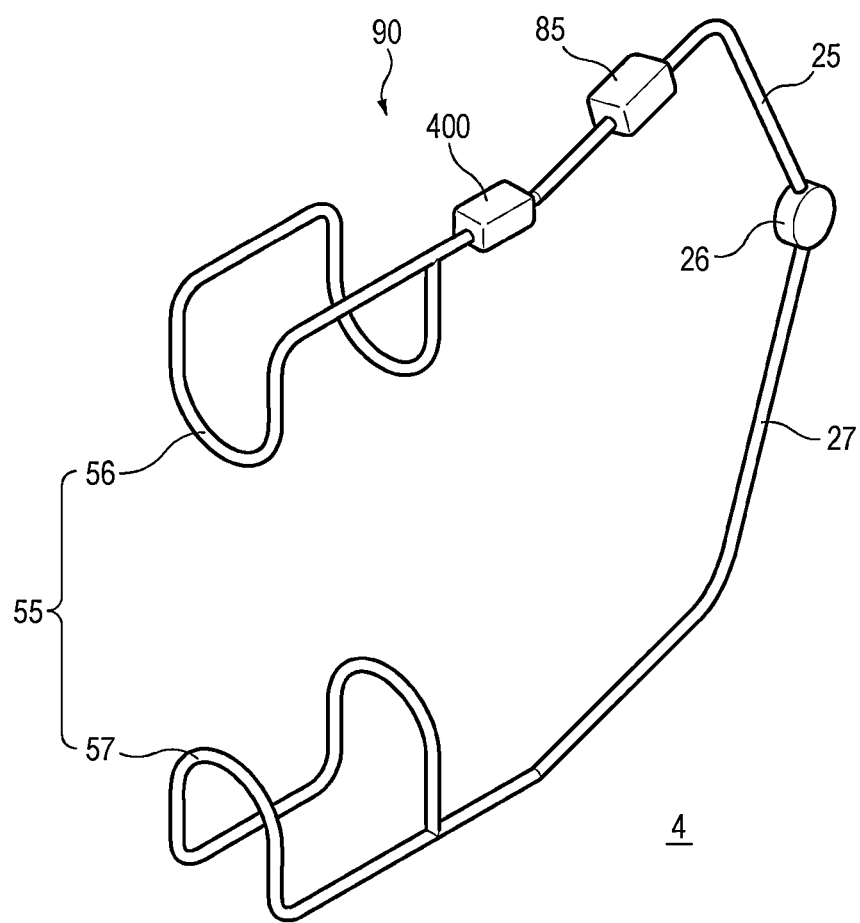
FIG. 4 is a perspective view illustrating an apparatus for measuring eyelid tension according to one embodiment of the present disclosure.

FIG. 4 is a perspective view illustrating an apparatus 4 for measuring eyelid tension according to one embodiment of the present disclosure. Descriptions of components overlapping those described in the above embodiment will be omitted.

The apparatus 4 for measuring eyelid tension may include an eyelid speculum 90 and a displacement sensor 400. The eyelid speculum 90 may include a first arm 25, a second arm 27, a joint 26 for connecting the first arm 25 and the second arm 27, and a pedestal 55 including a first pedestal 56 and a second pedestal 57. The first pedestal 56 may be connected to a leading end of the first arm 25. The second pedestal 57 may be connected to a leading end of the second arm 27. The displacement sensor 400 may be attached to a side surface of the first arm 25.

In this embodiment, the displacement sensor 400 may measure one eyelid tension. Here, the one eyelid tension refers to the eyelid tension corresponding to an initial interval between the first pedestal 56 and the second pedestal 57 before the eyelid speculum 90 is worn on the person to be measured. That is, in this embodiment, unlike the above-described embodiments, the eyelid speculum 90 has a structure in which the interval between the first pedestal 56 and the second pedestal 57 cannot be adjusted in advance by a user. In this case, it may be difficult for the user to measure the eyelid tension corresponding to each interval while adjusting the interval between the first pedestal 56 and the second pedestal 57.

Accordingly, in a state in which the person to be measured wears the apparatus 4 for measuring eyelid tension, the eyelid tension may be measured only with an output value itself output by the displacement sensor 400. When the eyelid tension of the person to be measured is large, the displacement sensor 400 may output a larger output value. When the eyelid tension of the person to be measured is small, the displacement sensor 400 may output a smaller output value.

Figure 5:
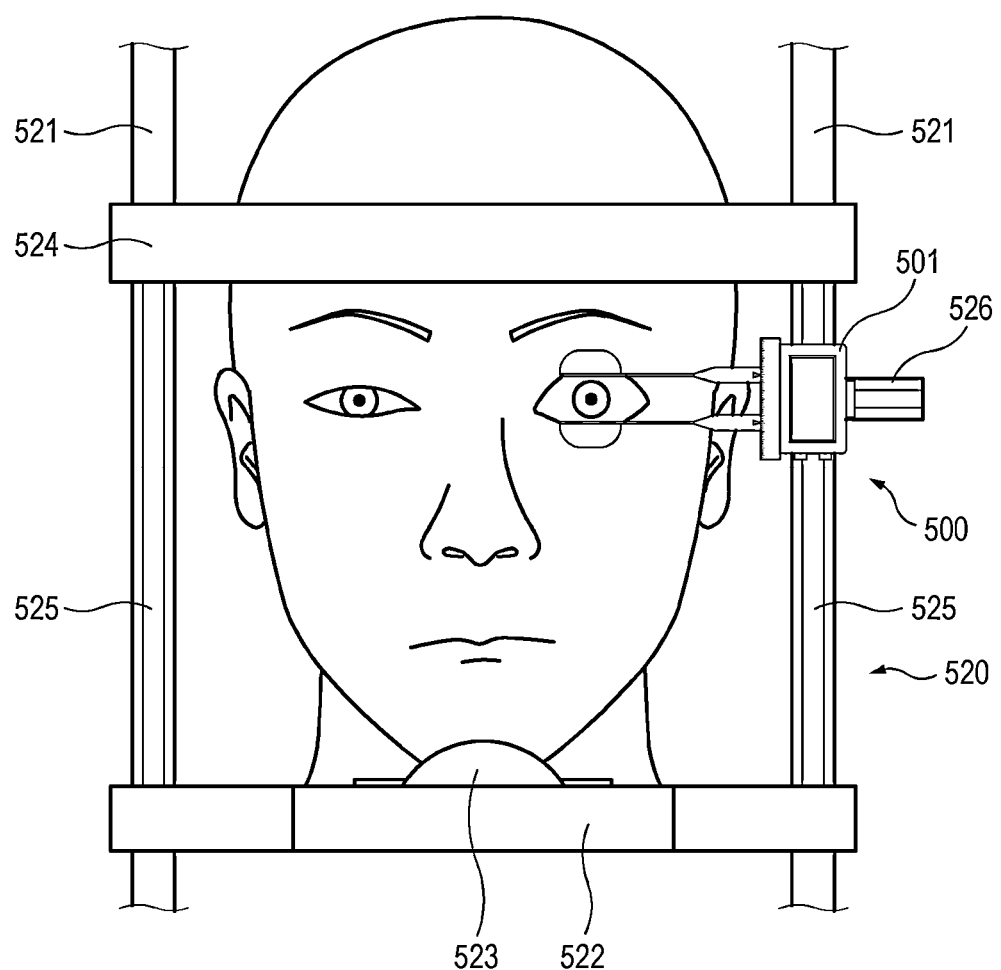
FIG. 5 is a perspective view illustrating an apparatus for measuring eyelid tension according to one embodiment of the present disclosure.
Figure 6:
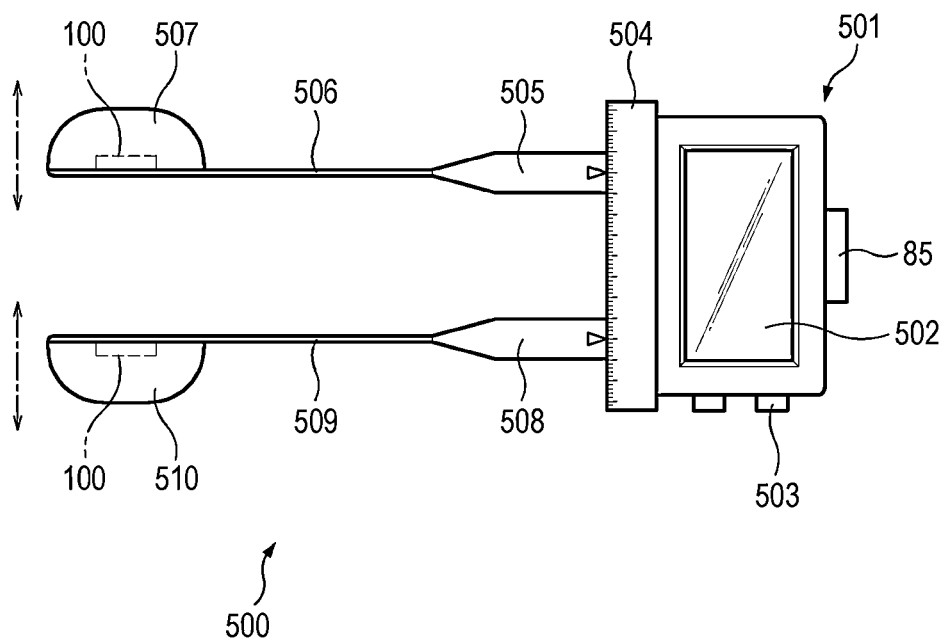
FIG. 6 is a perspective view illustrating a measuring unit of the apparatus for measuring eyelid tension shown in FIG. 5.

FIG. 5 is a perspective view illustrating an apparatus 5 for measuring eyelid tension according to one embodiment of the present disclosure. FIG. 6 is a perspective view illustrating a measuring unit 500 of the apparatus 5 for measuring eyelid tension shown in FIG. 5. Descriptions of components overlapping those described in the above embodiment will be omitted.

The apparatus 5 for measuring eyelid tension may include the measuring unit 500 and a mounting part 520 on which the measuring unit 500 is installed. The measuring unit 500 may be installed on the mounting part 520 and may be moved vertically or laterally. A face of the person to be measured may be placed on the mounting part 520. For example, the mounting part 520 may have a shape similar to that of a part of a slit lamp microscope which fixes a patient's face.

The mounting part 520 may include two pillars 521 spaced apart from each other by a predetermined interval, an upper frame 524 installed at upper sides of the two pillars 521, and a lower frame 522 installed at lower sides of the two pillars 521. The lower frame 522 may include a chinrest 523 for supporting a chin of the person to be measured.

A first rail 525 configured to vertically move the measuring unit 500 may be installed in each of the two pillars 521. The first rail 525 may be formed in a portion between the upper frame 524 and the lower frame 522. Accordingly, a doctor may vertically move the measuring unit 500 along the first rail 525 according to an eyelevel of the person to be measured in a vertical direction.

The measuring unit 500 may be installed on a second rail 526. That is, the measuring unit 500 may be laterally moved along the second rail 526. Accordingly, the doctor may laterally move the measuring unit 500 along the second rail 526 to match an eye position according to a face width of the person to be measured in a lateral direction. Meanwhile, the second rail 526 may be installed on the first rail 525. Accordingly, the second rail 526 on which the measuring unit 500 is installed may be vertically moved along the first rail 525.

As described above, the measuring unit 500 can be laterally moved along the second rail 526, thereby minimizing a situation in which a measured value of the eyelid tension is affected when the person to be measured turns his or her head left and right.

The apparatus 5 for measuring eyelid tension may be used by being erected upright in a direction perpendicular to a ground surface like a general slit lamp microscope. In the case of general ophthalmic treatment, since the mounting part 520 is used as a type (i.e., a fixed type) which is erected perpendicular to the ground surface, when a doctor desires a corresponding treatment method, the mounting part 520 may be set as a fixed type to measure the eyelid tension.

As another example, the apparatus 5 for measuring eyelid tension may be used in a state of lying parallel to the ground surface. In this case, the apparatus 5 for measuring eyelid tension is used as a type (i.e., a movable type) which is moved to match a posture of the person to be measured in a state in which the person to be measured lies, thereby further improving the convenience of the person to be measured.

The measuring unit 500 may include a main body 501 installed on the second rail 526. The measuring unit 500 may constitute the form of, for example, one eyelid speculum. A communication module 85 may be installed at one side of the main body 501. A switch 503 may be installed at a lower side of the main body 501 to turn the measuring unit 500 on/off. A first arm 505 and a second arm 508 may be movably coupled to the other side of the main body 501 with a predetermined interval therebetween.

Each of the first arm 505 and the second arm 508 may be moved upward or downward in a state of being coupled to the main body 501. For example, a rail (not shown) may be installed at the other side of the main body 501, and each of the first arm 505 and the second arm 508 may be moved upward or downward along the rail (not shown).

A first leg part 506 may be connected to a leading end of the first arm 505, and a second leg part 509 may be connected to a leading end of the second arm 508. In addition, a first pedestal 507 may be connected to the first leg part 506, and a second pedestal 510 may be connected to the second leg part 509. Meanwhile, the pressure sensor 100 may be installed in each of the first pedestal 507 and the second pedestal 510. The pressure sensor 100 installed in the first pedestal 507 may be configured to measure the eyelid tension of the upper eyelid. In addition, the pressure sensor 100 installed in the second pedestal 510 may be configured to measure the eyelid tension of the lower eyelid.

A distance indicator 504 may be installed between the main body 501 and the first and second arms 505 and 508. The distance indicator 504 may be marked, for example, with a millimeter scale. Accordingly, a doctor can intuitively recognize an interval between the first arm 505 and the second arm 508 in a process of using the measuring unit 500.

The main body 501 may include a display 502 configured to display the eyelid tension measurement data. The distance indicator 504 may transmit data about the interval between the first arm 505 and the second arm 508 to the display 502. The display 502 may display the interval. In addition, the eyelid tension data of the upper eyelid measured by the pressure sensor 100 installed in the first pedestal 507 may be transmitted to the display 502, and the display 502 may display the eyelid tension data. Furthermore, the eyelid tension data of the lower eyelid measured by the pressure sensor 100 installed in the second pedestal 510 may be transmitted to the display 502, and the display 502 may display the eyelid tension data.

Figure 7:
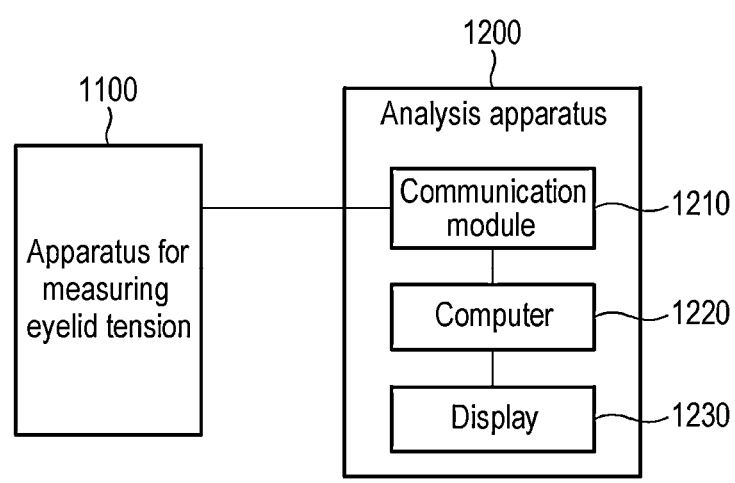
FIG. 7 is a structural diagram illustrating a system for measuring eyelid tension according to one embodiment of the present disclosure.

FIG. 7 is a structural diagram illustrating a system 1000 for measuring eyelid tension according to one embodiment of the present disclosure.

The system 1000 for measuring eyelid tension may include an apparatus 1100 for measuring eyelid tension and an analysis apparatus 1200. The apparatus 1100 for measuring eyelid tension may transmit the eyelid tension data to the analysis apparatus 1200 in a wired manner or a wireless manner. As the apparatus 1100 for measuring eyelid tension, the apparatuses 1, 2, 3, 4, and 5 for measuring eyelid tension shown in FIGS. 1 to 5 may be used. However, the apparatus 1100 for measuring eyelid tension is not limited to the above-described embodiments, and other types of configurations may be used.

The analysis apparatus 1200 may include a communication module 1210, a computer 1220, and a display 1230. The communication module 1210 may receive the eyelid tension data transmitted from the apparatus 1100 for measuring eyelid tension to transmit the eyelid tension data to the computer 1220. The computer 1220 may analyze the eyelid tension data to determine an eye state of the person to be measured.

Based on the eyelid tension data, the computer 1220 may classify the eye state of the person to be measured into a plurality of grades, for example, three grades, such as a weak grade corresponding to weak eyelid tension, a normal grade having an average value of eyelid tension, and a strong grade corresponding to strong eyelid tension. As another example, the eye state of the person to be measured may be classified into a total of 10 grades in which a grade corresponding to the relatively weakest eyelid tension is classified as a first grade and a grade corresponding to the relatively strongest eyelid tension is classified as a tenth grade. As described above, a method of classifying an eyelid state may be variously presented and is not limited to the above-described example.

The display 1230 displays pre-stored eyelid tension data, measured eyelid tension data, and eyelid state information. Based on the above-described pieces of data, a doctor may advise the person to be measured (i.e., a patient) or may diagnose the possibility of LASIK/LASEK surgery.

Figure 8:
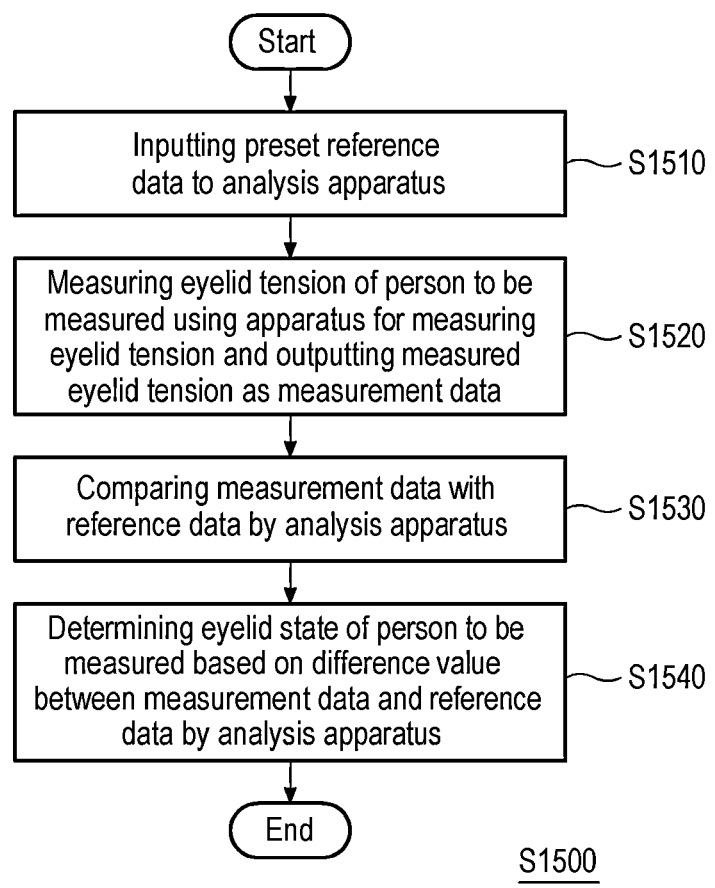
FIG. 8 is a flowchart for describing a method of processing eyelid tension data according to one embodiment of the present disclosure.

FIG. 8 is a flowchart for describing a method S1500 of processing eyelid tension data according to one embodiment of the present disclosure.

The method S1500 of processing eyelid tension data may include inputting preset reference data to an analysis apparatus (S1510), measuring eyelid tension of the person to be measured using an apparatus for measuring eyelid tension and outputting the measured eyelid tension as measurement data (S1520), comparing the measurement data with reference data by the analysis apparatus (S1530), and determining an eyelid state of the person to be measured based on a difference value between the measurement data and the reference data by the analysis apparatus (S1540).

FIG. 9 is a table 2000 for describing the method S1500 of processing eyelid tension data according to one embodiment of the present disclosure.

Referring to FIG. 9, the table 2000 may include a classification criterion 2050, reference data 2100, measurement data 2200, and eyelid states 2300. The classification criterion 2050 may be the interval L described with reference to FIGS. 1 to 3. Units of the interval may be millimeters.

The reference data 2100 may be an average value calculated based on measurement data of a plurality of patients measured according to each interval. The reference data 2100 may include a reference output voltage (unit: V) and reference eyelid tension (unit: N). For example, when the interval is 3 mm, the reference output voltage may be $V_{R1}$ and the reference eyelid tension may be $T_{R1}$. Each reference output voltage and each reference eyelid tension corresponding thereto may be determined according to a preset characteristic of each sensor which outputs the reference output voltage.

The measurement data 2200 may be measurement data of an individual patient actually measured according to each interval. The measurement data 2200 may include a measured output voltage (unit: V) and measured eyelid tension (unit: N). For example, when the interval is 3 mm, the measured output voltage may be VM1 and the measured eyelid tension may be TM1.

The eyelid state 2300 may refer to data determined by comparing the reference eyelid tension of the reference data 2100 with the measured eyelid tension of the measurement data 2200. For example, when the eyelid state is classified into three grades (a weak grade, a medium grade, and a strong grade), the eyelid state may be determined as follows. When the measured eyelid tension of the measurement data 2200 is in a range of +20% to −20% of the reference eyelid tension of the reference data 2100, it may be determined that the eyelid state 2300 is the medium grade. In addition, when the measured eyelid tension of the measurement data 2200 is less than −20% of the reference eyelid tension of the reference data 2100, it may be determined that the eyelid state 2300 is the weak grade. Furthermore, when the measured eyelid tension of the measurement data 2200 exceeds +20% of the reference eyelid tension of the reference data 2100, it may be determined that the eyelid state 2300 is the strong grade.

Hereinafter, exemplary eyelid tension data measured by the apparatus for measuring eyelid tension according to the embodiments of the present disclosure will be described. For convenience of description, descriptions will be made with reference to the apparatuses 1, 2, and 3 for measuring eyelid tension shown in FIGS. 1 to 3. In addition, for convenience of description, three grades of the weak grade, the medium grade, and the strong grade are described, but the grade may be further subdivided according to a method of classifying a grade.

Figure 10:
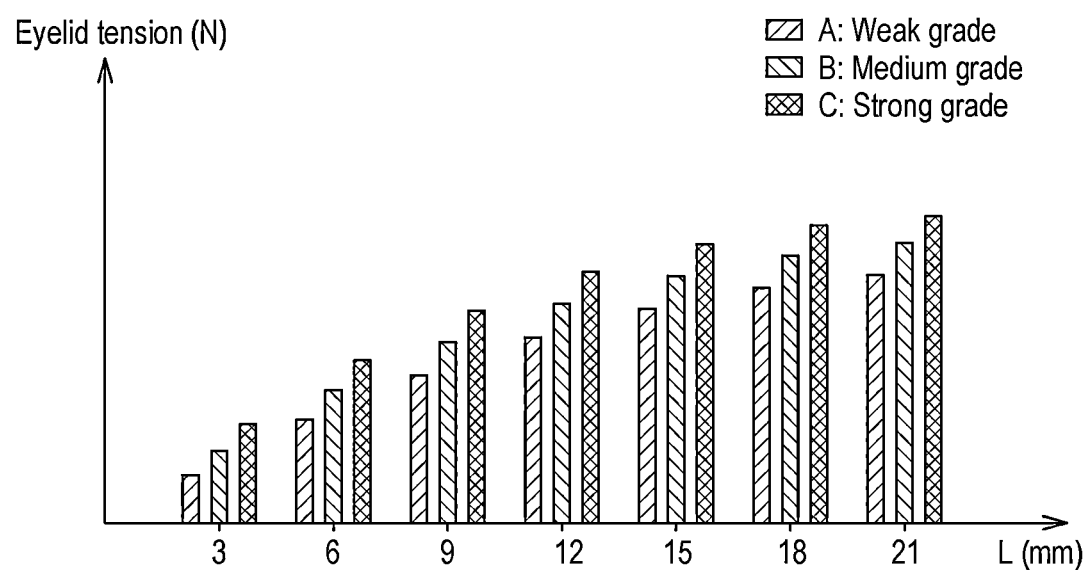
FIG. 10 is a graph showing eyelid tension data according to one embodiment of the present disclosure.

FIG. 10 is a graph showing eyelid tension data according to one embodiment of the present disclosure.

The X-axis may denote the interval L (unit: mm), and the Y-axis may denote measured the eyelid tension (unit: N). A measured value denoted by "A" indicates a measured value of the weak grade corresponding to the weak eyelid tension of the person to be measured. A measured value denoted by "B" indicates a measured value of the medium grade corresponding to the medium eyelid tension of the person to be measured. A measured value denoted by "C" indicates a measured value of the strong grade corresponding to the strong eyelid tension of the person to be measured. For example, the graph shown in FIG. 10 may be made based on the table shown in FIG. 9. In addition, the graph shown in FIG. 10 may be displayed on the display 1230 shown in FIG. 7.

Figure 11:
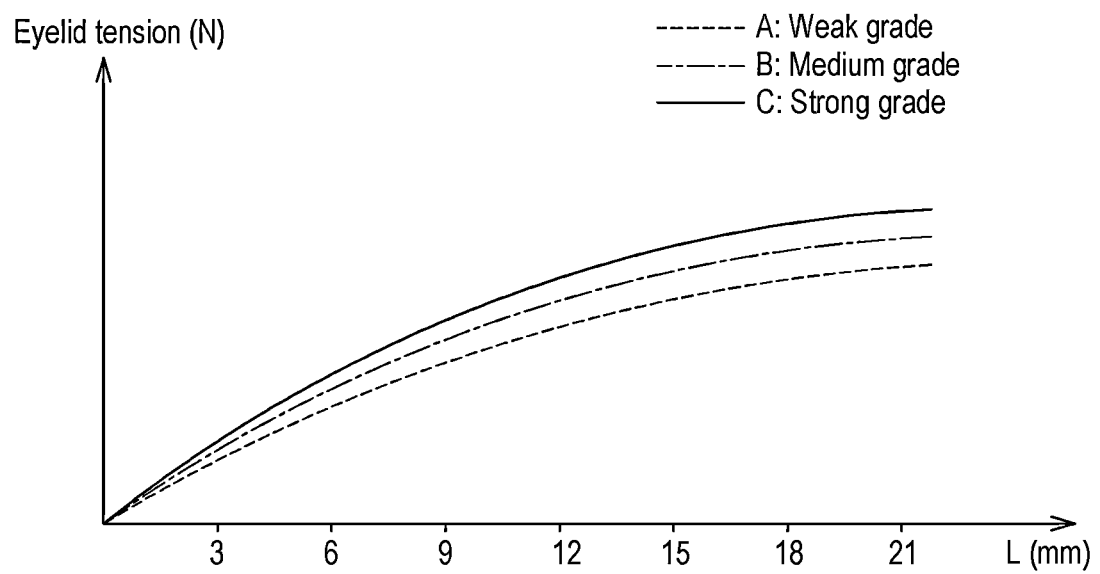
FIG. 11 is a graph showing eyelid tension data according to one embodiment of the present disclosure.

FIG. 11 is a graph showing eyelid tension data according to one embodiment of the present disclosure.

In the graph shown in FIG. 11, the eyelid tension, which is continuously measured by continuously increasing the interval L, is shown in the form of a curve. A measured value denoted by "A" indicates a measured value of the weak grade corresponding to the weak eyelid tension of the person to be measured. A measured value denoted by "B" indicates a measured value of the medium grade corresponding to the medium eyelid tension of the person to be measured. A measured value denoted by "C" indicates a measured value of the strong grade corresponding to the strong eyelid tension of the person to be measured.

The graph shown in FIG. 11 may be displayed on the display 1230 shown in FIG. 7. Referring to the graph shown in FIG. 11, a difference in eyelid tension between respective grades can be visually confirmed more clearly.

Although the present disclosure has been described heretofore with reference to some embodiments and examples shown in the accompanying drawings, it should be noted that there may be various substitutions, modifications, and changes without departing from the technical idea and scope of the present disclosure, which can be understood by those skilled in the technical field to which the present disclosure pertains. In addition, such substitutions, modifications, and changes should be construed to belong to the scope of the claims appended herein.

What is claimed is:

1. An apparatus for measuring an eyelid tension, comprising:
an eyelid speculum configured to widen an interval between an upper eyelid and a lower eyelid;
an eyelid tension measuring sensor attached to one side of the eyelid speculum and configured to measure the eyelid tension of a person to be measured and output eyelid tension data; and
a position sensor configured to measure the interval between the upper eyelid and the lower eyelid,
wherein the eyelid speculum includes:
two arms having shapes symmetrical to each other with respect to a central axis;
two links rotatably connected to the two arms, respectively, and disposed symmetrically with respect to the central axis;
a connection member configured to rotatably connect the two links to each other;
a frame rotatably connected to one end portion of each of the two arms;
a screw screw-coupled to the frame, one end portion of the screw being coupled to the connection member; and
a first pedestal and a second pedestal coupled to the other end portions of the two arms, respectively, and configured to support the upper eyelid and the lower eyelid, respectively.

2. The apparatus of claim 1, wherein the eyelid tension measuring sensor is installed in at least one of the first pedestal or the second pedestal and is configured to measure a pressure applied to the first pedestal and the second pedestal.

3. The apparatus of claim 1, wherein the position sensor is installed on at least one of the first pedestal or the second pedestal and measures an interval between the first pedestal and the second pedestal.

4. A method of processing eyelid tension data, comprising:
inputting preset reference data to an analysis apparatus;
measuring an eyelid tension of a person to be measured using the apparatus for measuring eyelid tension of claim 1 and outputting the measured eyelid tension as measurement data;
comparing the measurement data with the reference data by the analysis apparatus; and
determining an eyelid state of the person to be measured based on a difference value between the measurement data and the reference data.

5. The method of claim 4, wherein the reference data is calculated based on the measurement data of a plurality of persons to be measured which are measured according to a preset interval.

6. An apparatus for measuring an eyelid tension, comprising:
an eyelid speculum configured to widen an interval between an upper eyelid and a lower eyelid;
an eyelid tension measuring sensor attached to one side of the eyelid speculum and configured to measure the eyelid tension of a person to be measured and output eyelid tension data; and
a position sensor configured to measure the interval between the upper eyelid and the lower eyelid,
wherein the eyelid speculum includes:

a main body;

a first arm and a second arm movably coupled to the main body with a predetermined interval between the first arm and the second arm;

a first leg and a second leg coupled to the first arm and the second arm, respectively; and a first pedestal and a second pedestal coupled to the first leg and the second leg, respectively.

7. The apparatus of claim 6, wherein the eyelid tension measuring sensor is installed in each of the first pedestal and the second pedestal and is configured to measure pressures applied to the first pedestal and the second pedestal.

8. The apparatus of claim 6, wherein the eyelid speculum further includes a distance indicator configured to indicate a distance between the first arm and the second arm.

9. The apparatus of claim 6, wherein the main body includes a display configured to display the eyelid tension data.

10. The apparatus of claim 6, further comprising a mounting part on which the eyelid speculum is installed to be moved vertically or laterally.

\* \* \* \* \*